(12) United States Patent
Houzumi et al.

(10) Patent No.: US 9,997,972 B2
(45) Date of Patent: Jun. 12, 2018

(54) BUS BAR UNIT AND MANUFACTURING METHOD OF BUS BAR UNIT

(71) Applicant: KAYABA INDUSTRY CO., LTD., Tokyo (JP)

(72) Inventors: Nobuji Houzumi, Kanagawa (JP); Tarou Matsumae, Kanagawa (JP); Yoshiteru Kurokawa, Kanagawa (JP); Suguru Sakamoto, Kanagawa (JP); Tohru Takimoto, Fukui (JP); Shingo Yamada, Fukui (JP)

(73) Assignee: KYB Corporation, Tokyo (JP)

( * ) Notice: Subject to any disclaimer, the term of this patent is extended or adjusted under 35 U.S.C. 154(b) by 410 days.

(21) Appl. No.: 14/771,708

(22) PCT Filed: Jan. 23, 2014

(86) PCT No.: PCT/JP2014/051412
§ 371 (c)(1),
(2) Date: Aug. 31, 2015

(87) PCT Pub. No.: WO2014/136488
PCT Pub. Date: Sep. 12, 2014

(65) Prior Publication Data
US 2016/0020660 A1    Jan. 21, 2016

(30) Foreign Application Priority Data
Mar. 8, 2013  (JP) ................. 2013-047236

(51) Int. Cl.
*H02K 15/12* (2006.01)
*H02K 3/50* (2006.01)
*H02K 3/52* (2006.01)
*H02K 15/00* (2006.01)

(52) U.S. Cl.
CPC ............... *H02K 3/50* (2013.01); *H02K 3/522* (2013.01); *H02K 15/0062* (2013.01); *H02K 15/12* (2013.01); *H02K 2203/09* (2013.01)

(58) Field of Classification Search
CPC .. H02K 3/50–3/528; H02K 15/0062–15/0093; H02K 15/12
See application file for complete search history.

(56) References Cited

U.S. PATENT DOCUMENTS

2003/0094879 A1   5/2003  Kobayashi et al.
2011/0074230 A1   3/2011  Hasegawa et al.

FOREIGN PATENT DOCUMENTS

| CN | 102035284 A | 4/2011 |
|---|---|---|
| CN | 102957270 A | 3/2013 |
| EP | 2139098 A2 | 12/2009 |
| JP | 2003-134728 A | 5/2003 |

*Primary Examiner* — Ramon M Barrera
(74) *Attorney, Agent, or Firm* — Rabin & Berdo, P.C.

(57) ABSTRACT

A bus bar of a bus bar unit includes a main body part extended along a circumferential direction of the stator such that a plate thickness direction of the bus bar agrees with an axial direction of the stator; an extension part extended from the main body part in a radial direction of the stator; and a coil connection part provided at a tip of the extension part, the coil connection part being connectable to a winding terminal of the coil. The extension part includes a retained part having surfaces perpendicular to the axial direction of the stator on both sides of the plate thickness direction. The retained part are held by molds for the insert molding of the bus bar when the insulating resin is formed by the insert molding of the bus bar.

1 Claim, 11 Drawing Sheets

BUS BAR UNIT AND MANUFACTURING METHOD OF BUS BAR UNIT

TECHNICAL FIELD

The present invention relates to a bus bar unit that passes a current to respective windings of a motor, and a manufacturing method of the bus bar.

BACKGROUND ART

It is well known that a bus bar is used for distributing a current to respective windings of a motor from an external terminal portion.

JP2003-134728A describes that three annular bus bars corresponding to a U-phase, a V-phase, and a W-phase, and a annular insulating holder having three grooves in total, receiving the respective bus bars, are subjected to insert molding. Namely, the insulating holder that has received the three bus bars in the grooves is arranged in a mold, and then a molten insulating resin is injected into the mold, thereby the insulating holder and the three bus bars are integrated.

SUMMARY OF INVENTION

According to the above-mentioned conventional technology, each of the bus bars has a structure that is formed in a shape along the circumferential direction of a stator, by curving a straight band-shaped conductive member in the plate thickness direction. Therefore, when diameters of the respective bus bars are different, the insert molding can be performed after the three bus bars are respectively received in the insulating holder.

However, when the bus bars have a structure that is formed by punching a plate-shaped conductive member into a shape that has a predetermined width and that curves along the circumferential direction of the stator, respective the bus bars are stacked in the axial direction. In this case, the insert molding is performed while the respective bus bars are stacked in the axial direction and are held with predetermined spaces therebetween.

The spaces between the respective bus bars are secured by a plurality of pins that are arranged along the circumferential direction between the bus bars. However, a large force is applied to the respective bus bar at the time of the insert molding, due to a pressure of the molten resin injected into the mold. Therefore, the above-mentioned pins may not be strong enough to keep the spaces between the respective bus bars.

It is an object of the present invention to keep the respective bus bars more strongly at the time of the insert molding.

According to one aspect of the present invention, a bus bar unit includes: a bus bar configured to pass a current to a coil wound around a stator, the bus bar being formed of an annular-shaped or an arc-shaped conductive member; and an insulating resin formed by insert molding of the bus bar. The bus bar includes a main body part extended along a circumferential direction of the stator such that a plate thickness direction of the bus bar agrees with an axial direction of the stator; an extension part extended from the main body part in a radial direction of the stator; and a coil connection part provided at a tip of the extension part, the coil connection part being connectable to a winding terminal of the coil. The extension part includes a retained part having surfaces perpendicular to the axial direction of the stator on both sides of the plate thickness direction. The retained part are held by molds for the insert molding of the bus bar when the insulating resin is formed by the insert molding of the bus bar.

DESCRIPTION OF EMBODIMENTS

With reference to the drawings, an embodiment of the present invention will be described.

Figure 1:
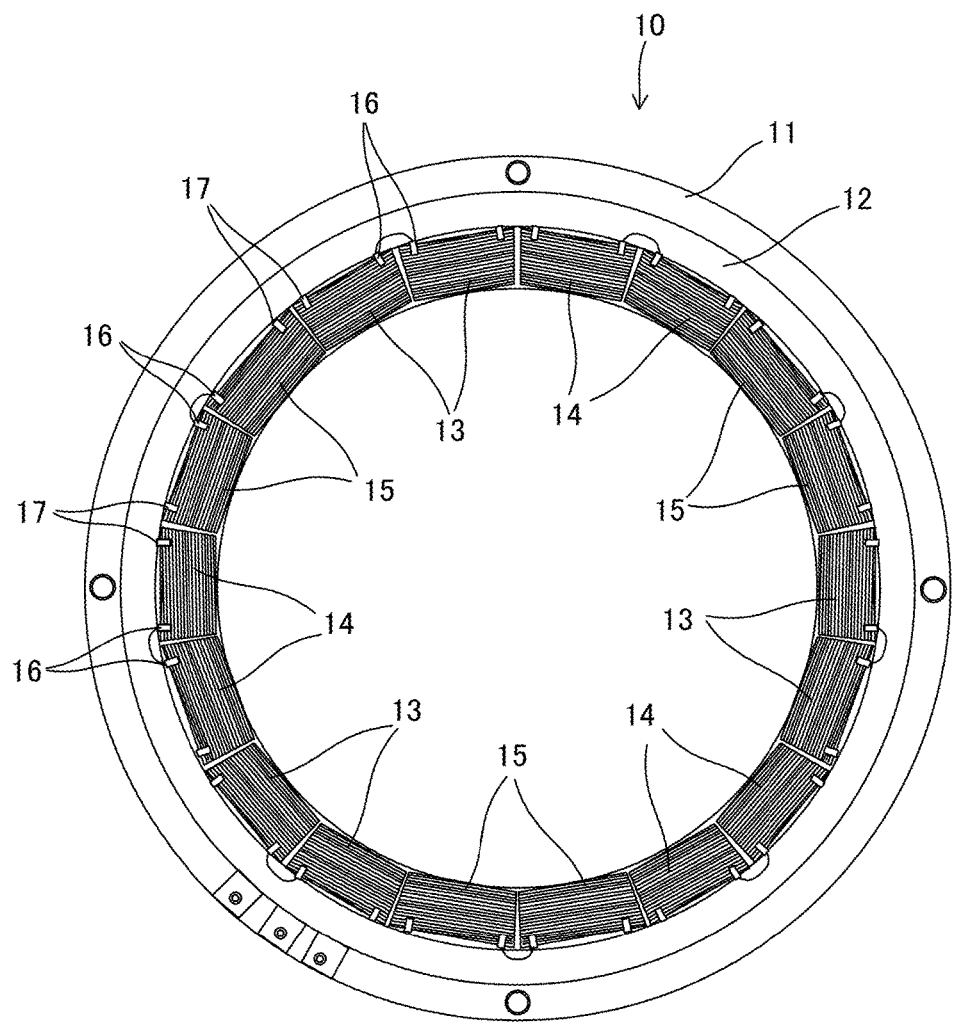
FIG. 1 is a structural diagram of a stator that constitutes a three phase AC motor.

FIG. 1 is a structural diagram of a stator that constitutes a three phase AC motor.

A plurality of teeth, which are not illustrated, are formed on an annular-shaped stator core 12 that is held in a housing 11 in such a manner that the teeth project toward the inner periphery side. Copper wires are wound around the teeth to form coils 13, 14 and 15.

Coils 13, 14 and 15, eighteen coils in total, are disposed on the stator core 12 annularly along the circumferential direction of the stator 10. Each of the coils 13, 14 and 15 corresponds to any one of a U-phase, a V-phase, and a W-phase, and the two of the coils 13, 14 and 15 of the same phase, which make a pair, are arranged along the circumferential direction of the stator 10 at 120-degree intervals. Namely, the two adjacent V-phase coils 14 are arranged next to the two adjacent U-phase coils 13, and the two adjacent W-phase coils 15 are arranged next to the two adjacent V-phase coils 14. Thus, three sets, each of which has the U-phase coils 13, the V-phase coils 14, and the W-phase coils 15, are arranged along the circumferential direction of the stator 10.

Winding terminals 16 of the adjacent coils 13, 14 and 15 of the respective phases are connected to each other. In addition, the coils 13, 14 and 15 of the respective phases are connected to a later-described bus bar unit 20 via winding terminals 17 of the coils 13, 14 and 15 of the respective phases.

Figure 2:
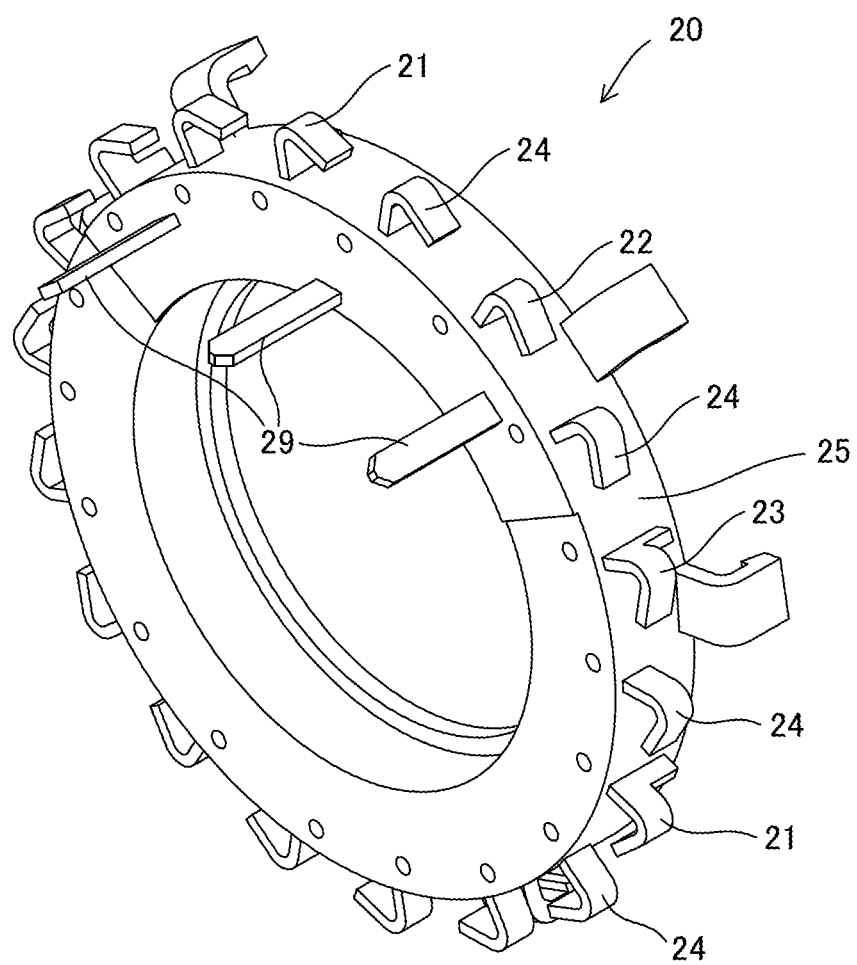
FIG. 2 is a perspective view illustrating a bus bar unit.

FIG. 2 is a perspective view illustrating the bus bar unit 20.

The bus bar unit 20 is provided concentrically with the stator 10, at an end of the axial direction of the stator 10. The stator 10 is arranged on the upper right side of the bus bar unit 20 in FIG. 2. The bus bar unit 20 has bus bars 21, 22, and 23 that correspond to the respective phases, a neutral point bus bar 24 that electrically connects neutral points of the respective phases, and an insulating resin 25 that receives all the bus bars 21 to 24, and the insulating resin 25 is molded in a state in which the respective bus bars 21 to 24 are insulated. The respective bus bars 21 to 24 and the insulating resin 25 are integrated by insert molding.

Figure 3A:
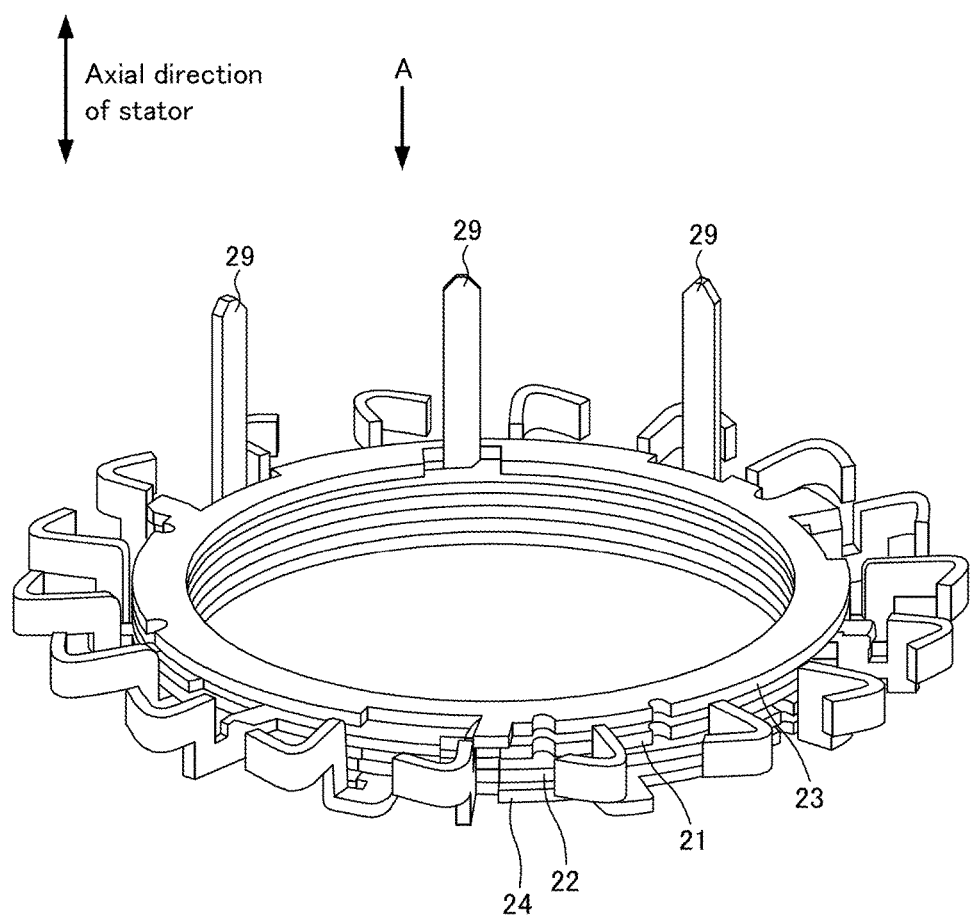
FIG. 3A is a perspective view illustrating the state in which respective bus bars are stacked.
Figure 3B:
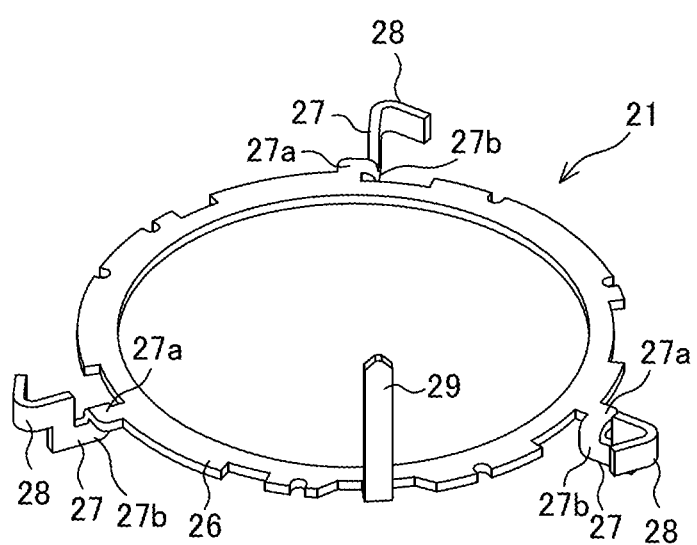
FIG. 3B is a perspective view of a U-phase bus bar.
Figure 3C:
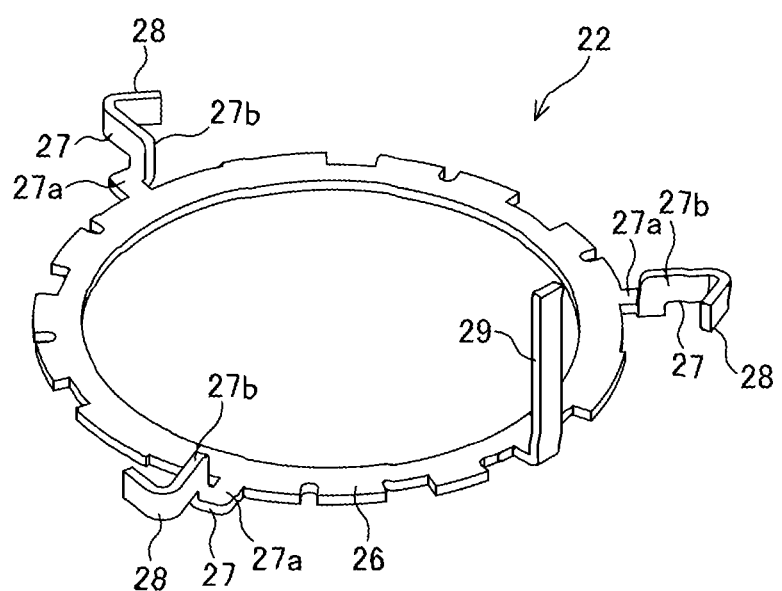
FIG. 3C is a perspective view of a V-phase bus bar.
Figure 3D:
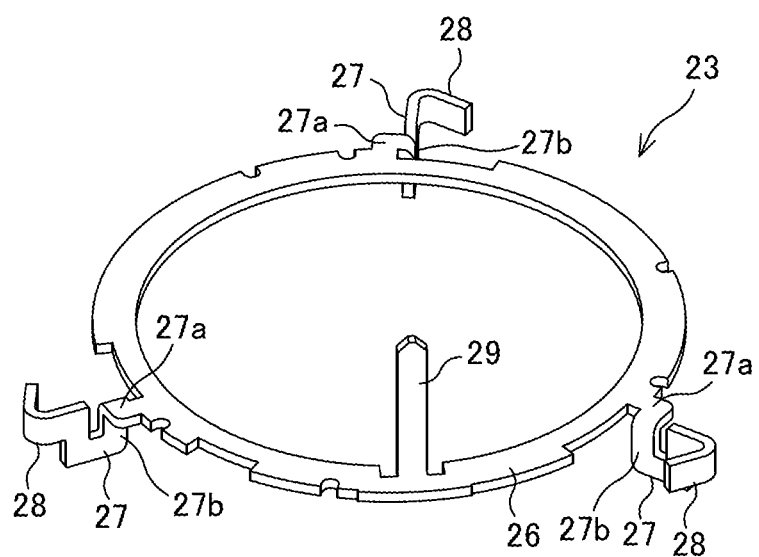
FIG. 3D is a perspective view of a W-phase bus bar.
Figure 3E:
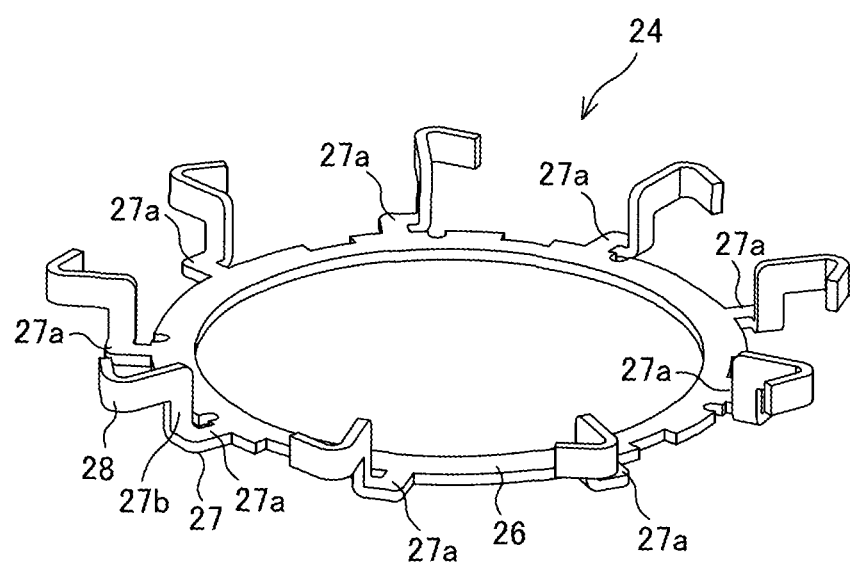
FIG. 3E is a perspective view of a bus bar for a neutral point.

FIG. 3A is a perspective view illustrating a state in which the respective bus bars 21 to 24 are stacked. FIG. 3B is a perspective view of the U-phase bus bar 21. FIG. 3C is a perspective view of the V-phase bus bar 22. FIG. 3D is a perspective view of the W-phase bus bar 23. FIG. 3E is a perspective view of the neutral point bus bar 24.

The bus bars 21 to 24 include the U-phase bus bar 21 that is connected to one end side of the U-phase coil 13, the V-phase bus bar 22 that is connected to one end side of the V-phase coil 14, the W-phase bus bar 23 that is connected to one end side of the W-phase coil 15, and the neutral point bus bar 24 that is connected to the other end sides of the U-phase coil 13, the V-phase coil 14, and the W-phase coil 15.

Each of the bus bars 21 to 24 has an annular-shaped main body part 26, extension parts 27 that are extended from the main body part 26 to the outer side of the radial direction of the stator 10, and coil connection parts 28 that are provided at the tip of the extension direction of the extension parts 27. In addition, each of the bus bars 21 to 23, corresponding to the respective phase, has a respective phase terminal 29 that is extended from the main body part 26 to the outside of the insulating resin 25 along the axial direction of the stator 10, and the respective phase terminal 29 is connected to an external wiring.

As illustrated in FIG. 2, the bus bar unit 20 distributes a current, supplied from a not-illustrated power source, to the coils 13, 14 and 15 of the respective phases via the respective phase terminals 29 as external terminals.

As illustrated in FIG. 3B to FIG. 3E, the main body part 26, the extension parts 27, and the coil connection parts 28 of each of the bus bars 21 to 24 are integrally formed of a conductive member having a band plate shape.

The main body part 26 is extended along the circumferential direction of the stator 10 in such a manner that the plate thickness direction agrees with the axial direction of the stator 10. Namely, the thickness in the axial direction of the main body part 26 is the plate thicknesses of the conductive member, and the width in the radial direction is the band width of the conductive member.

Each of the extension parts 27 has a retained part 27a that is extended from the main body part 26 to the outer side of the radial direction and that is provided to extend on the same surface as the main body part 26, and a bent part 27b that is bent from the tip of the retained part 27a along the axial direction of the stator 10 and that is bent toward the outer side of the radial direction. The retained part 27a has the surfaces that are perpendicular to the axial direction of the stator 10 on both sides of the plate thickness direction, and is supported at the predetermined position by support pins of a mold, at the time of the insert molding. Three extension parts 27 are provided on each of the bus bars 21 to 23 of the respective phases, and nine extension parts 27 are provided on the bus bar for the neutral point bus bar 24, and the extension parts 27 of each of the bus bar 21 to 24 are arranged at equal intervals in the circumferential direction of the respective bus bars 21 to 24.

Each of the coil connection parts 28 is extended from the tip of the bent part 27b, and is formed to have a hook shape by being bent into a substantially V shape in the plate thickness direction. The coil connection parts 28 are connected to wirings (not illustrated) that are extended from the winding terminals 17 of the coils 13, 14 and 15 of the respective phases.

As illustrated in FIG. 3A, the bus bar unit 20 is formed by stacking the respective bus bars 21 to 24 in the order of the W-phase bus bar 23, the U-phase bus bar 21, the V-phase bus bar 22, and the neutral point bus bar 24, in such a manner that central axes of the main body parts 26 of the respective bus bars 21 to 24 align with one another. Relative positions of the respective bus bars 21 to 24 in the circumferential direction are adjusted in such a manner that the extension parts 27 and the coil connection parts 28 are displaced at equal intervals in the circumferential direction of the main body parts 26.

Figure 4:
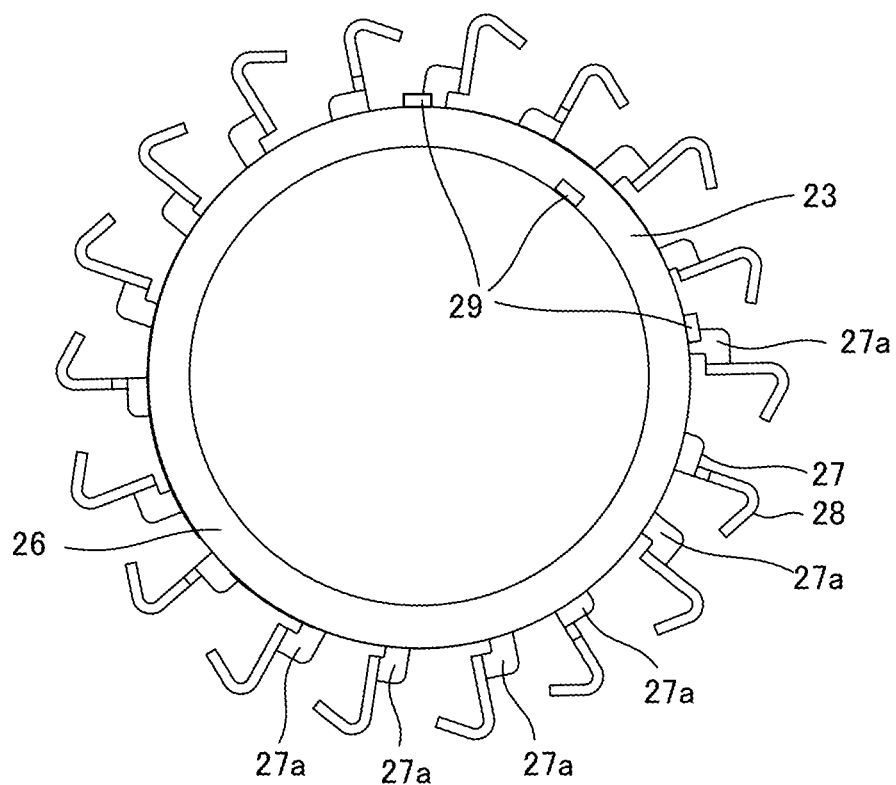
FIG. 4 is a front view of the stacked bus bars viewed from the direction of an arrow A in FIG. 3A.

FIG. 4 is a front view of the stacked bus bars 21 to 24 viewed from the direction of an arrow A in FIG. 3A. It should be noted that, although a plurality of notches and holes are provided in the main body parts 26 of the respective bus bars 21 to 24, as illustrated in FIG. 3B to FIG. 3E, the notches and the holes are omitted in FIG. 4 in order to clarify the arrangement of the retained parts 27a and to simplify the explanation.

The main body parts 26 of the respective bus bars 21 to 24 are arranged with predetermined spaces therebetween in the plate thickness direction of the main body parts 26. Meanwhile, the extension parts 27 and the coil connection parts 28 are projected from the main body parts 26 toward the outer side of the radial direction, and are arranged at equal intervals in the circumferential direction without being overlapped one another in the plate thickness direction of the main body parts 26.

Thus, all the retained parts 27a of the respective bus bars 21 to 24 are arranged at equal intervals along the circumferential direction of the bus bars 21 to 24.

Now, a manufacturing process of the bus bar unit 20 by the insert molding will be explained.

Figure 5:
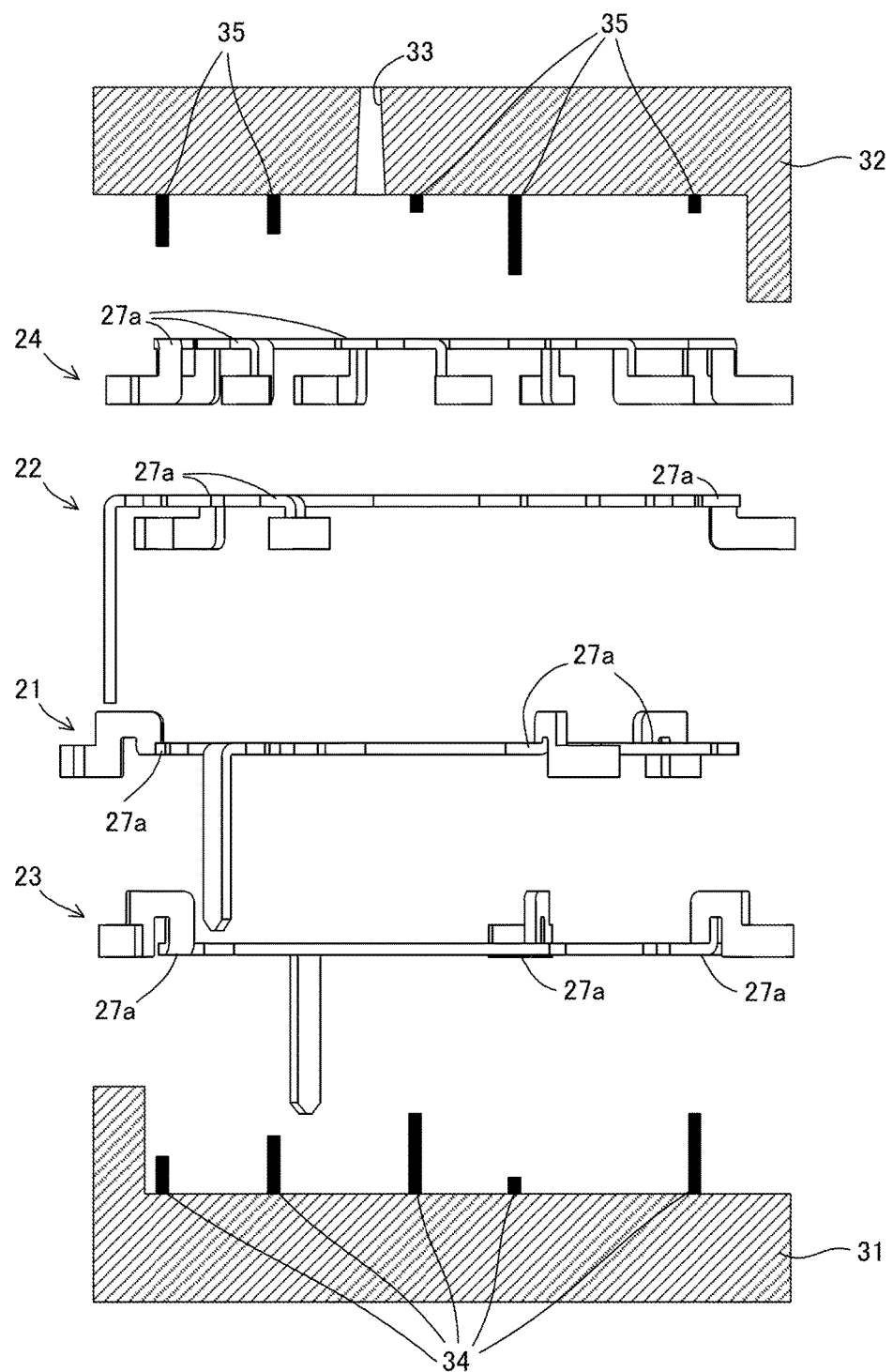
FIG. 5 is a schematic view for explaining insert molding.
Figure 6:
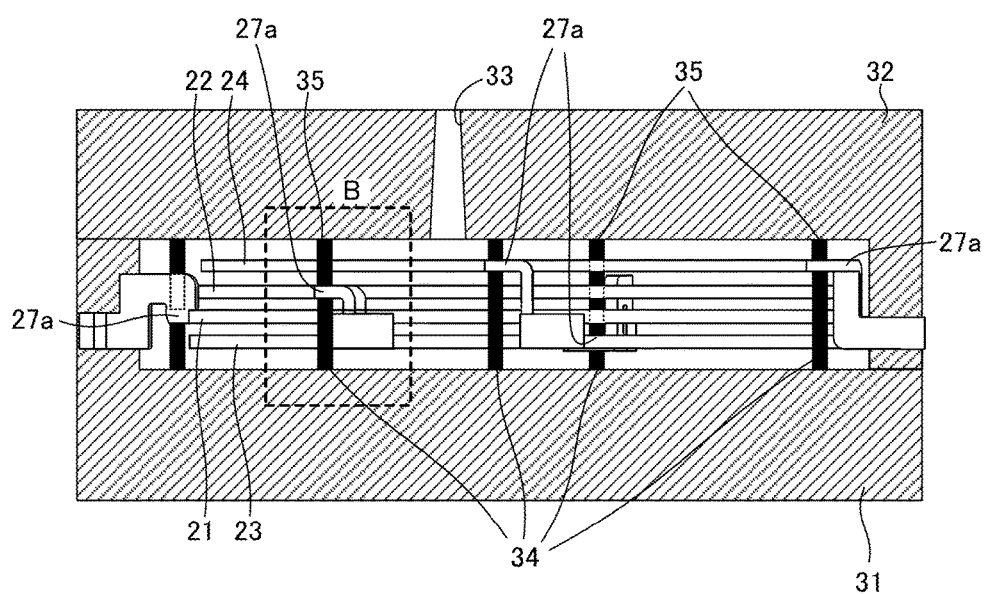
FIG. 6 is a schematic view for explaining the insert molding.
Figure 7:
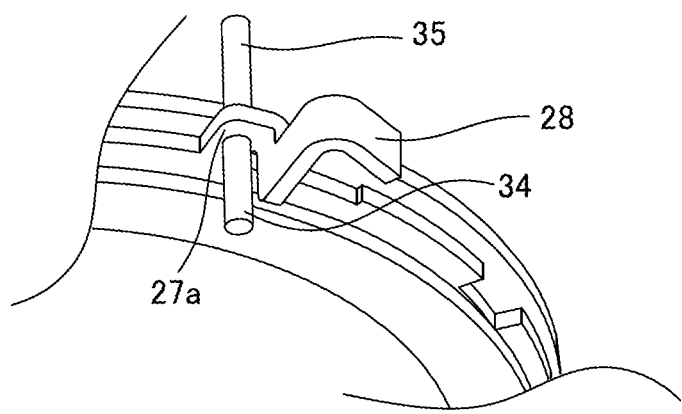
FIG. 7 is a perspective view that enlarges and illustrates an area B in FIG. 6.

FIG. 5 and FIG. 6 are schematic views for explaining the insert molding. FIG. 7 is a perspective view that enlarges and illustrates an area B in FIG. 6.

The insert molding is a molding method that allows the respective bus bars 21 to 24, which are held between a lower mold 31 that is arranged at the lower side of the vertical direction and an upper mold 32 that is arranged at the upper side of the lower mold 31, to be integrated by the insulating resin 25. The upper mold 32 has an injection hole 33 for injecting the molten insulating resin 25, and the injection hole 33 vertically penetrates the upper mold 32.

The lower mold 31 is provided with support pins 34 that support the lower surfaces of the retained parts 27a of the respective bus bars 21 to 24. The upper mold 32 is provided with support pins 35 that support the upper surfaces of the retained parts 27a of the respective bus bars 21 to 24. Namely, the support pins 34 and 35 hold the retained parts 27a of the bus bars 21 to 24 from the upper and the lower sides by the support pins 35 provided on the upper mold 32 and the support pins 34 provided on the lower mold 31 (refer to FIG. 7). The lengths of the support pins 34 and 35 on the upper and the lower sides are set in advance according to the positions of the bus bars 21 to 24, having the retained parts 27a to be supported, in the vertical direction (the axial direction of the bus bars 21 to 24).

It should be noted that only the five pairs of the support pins 34 and 35, each pair being provided on the upper and the lower sides, are illustrated in FIG. 5 and FIG. 6, in order to simplify the explanation. In actually, eighteen pairs of the support pins 34 and 35 are provided. In addition, the illustration of the respective phase terminals 29 and a part of the extension parts 27 is omitted in FIG. 6.

As illustrated in FIG. 5, the respective bus bars 21 to 24 are placed onto the lower mold 31 in the order of the W-phase bus bar 23, the U-phase bus bar 21, the V-phase bus bar 22, and the neutral point bus bar 24. As illustrated in FIG. 4, the retained parts 27a are arranged at equal intervals along the circumferential direction of the bus bars 21 to 24, and are projected to the outer side of the radial direction from the main body parts 26. Therefore, as illustrated in FIG. 6, the lower surfaces of all the retained parts 27a are abutted against the upper ends of the support pins 34 of the lower mold 31.

Next, the upper mold 32 is placed onto and pressed against the lower mold 31. Thereby, the upper surfaces of all the retained parts 27a are abutted against the lower ends of the support pins 35 of the upper mold 32.

The respective retained parts 27a are held by the support pins 34 and 35 from the upper and the lower sides, and restrained in the axial direction and the radial direction of the bus bars 21 to 24. In addition, as the positions in the vertical direction of the respective bus bars 21 to 24 are defined according to the lengths of the support pins 34 and 35 that are set in advance, the respective bus bars 21 to 24 are kept in a stacked state having the predetermined spaces therebetween.

Under this state, the molten insulating resin 25 is injected from the injection hole 33 of the upper mold 32 into a space defined between the upper mold 32 and the lower mold 31. At this time, a force is applied particularly in the vertical direction of the respective bus bars 21 to 24, due to an injection pressure of the insulating resin 25. However, the respective bus bars 21 to 24 are restrained between the upper mold 32 and the lower mold 31 by at least the three retained parts 27a, and hence the spaces between the bus bars 21 to 24 are kept.

After the insulating resin 25 is cured and the upper mold 32 and the lower mold 31 are removed, the bus bar unit 20 as illustrated in FIG. 2 is finished.

The following effects can be obtained according to the above-described embodiment.

The extension part 27 is provided with the retained parts 27a, each of which having the surfaces perpendicular to the axial direction of the stator 10 on both sides of the plate thickness direction. Thus, the retained parts 27a of the bus bars 21 to 24 are supported at the time of the insert molding, so as to keep the bus bars 21 to 24 at the desired positions more strongly.

The retained parts 27a are supported in such a manner that the plurality of bus bars 21 to 24 have the spaces therebetween in the axial direction of the stator 10. Thus, the spaces between the bus bars 21 to 24 can be kept at the time of the integration with the insulating resin 25 by the insert molding.

The retained parts 27a are arranged by being displaced, for each of the bus bars 21 to 24, in the circumferential direction. Therefore, the retained parts 27a can be held, for each of the bus bars 21 to 24, by the support pins 34 and 35 that are provided on the upper mold 32 and the lower mold 31.

In addition, as the respective bus bars 21 to 24 are kept directly by the support pins 34 and 35 that extend from the upper mold 32 or the lower mold 31, the respective bus bars 21 to 24 can be kept at the desired positions in the axial direction more accurately.

Embodiments of this invention were described above, but the above embodiments are merely examples of applications of this invention, and the technical scope of this invention is not limited to the specific constitutions of the above embodiments.

For example, each of the bus bars 21 to 24 has the annular shape according to the above-described embodiment, but may have an arc shape.

Further, according to the above-described embodiment, the case of performing the insert molding of the four kinds of the bus bars 21 to 24 has been explained as an example. However, the insert molding of the bus bars of three kinds or less or five kinds or more may be performed according to the type of the motor.

Furthermore, according to the above-described embodiment, the three phase AC motor having 18 coils 13, 14 and 15 has been explained as an example, but the number of the coils is not restrictive.

Further, according to the above-described embodiment, the respective bus bars 21 to 24 are disposed in the bus bar unit 20 in the order of the W-phase bus bar 23, the U-phase bus bar 21, the V-phase bus bar 22, and the neutral point bus bar 24, but may be arranged according to different orders. In this case, the respective bus bars 21 to 24 may be molded in such a manner that, after the insert molding, the positions of the coil connection parts 28 of the respective bus bars 21 to 24 are aligned in the axial direction.

Furthermore, according to the above-described embodiment, the bus bars 21 to 24 for distributing the current to the coils 13 to 15 that are wound around the stator 10 of the motor has been explained, but the bus bars 21 to 24 may be applied to a power generator.

Further, according to the above-described embodiment, the bus bar unit 20 are formed by performing the insert molding of the four bus bars 21 on one time. However, the bus bar unit 20 may be formed by performing the insert molding for a plurality of times.

For example, after one or more bus bars are stacked with predetermined spaces therebetween in a primary mold, primary insert molding is performed by injecting the molten insulating resin into the primary mold, so as to form a primary molded member. Thereafter, the remaining bus bars and the primary molded member are arranged in a secondary mold, and secondary insert molding is performed by injecting the molten insulating resin into the secondary mold, so as to form the bus bar unit 20.

In this case, the respective bus bars are supported by the support pins 34 and 35 of the lower mold 31 and the upper mold 32, as in the above-described embodiment, at the time of at least one of the primary insert molding and the secondary insert molding.

Furthermore, according to the above-described embodiment, the respective bus bars 21 to 24 are supported by the support pins 34 and 35 of the lower mold 31 and the upper mold 32, at the time of the insert molding, but the method of supporting the bus bars is not restrictive. For example, a plurality of support members, other than the support pins 34 and 35, may be provided in the lower mold 31 and the upper mold 32, and the holes or the notches, into which the support members are inserted, are provided in the respective bus bars 21 to 24, so as to support the retained parts 27a of the respective bus bars 21 to 24 by the support pins 34 and 35, and to support the main body parts 26 of the respective bus bars 21 to 24 by such support members.

This application claims priority based on Japanese Patent Application No. 2013-047236 filed with the Japan Patent Office on Mar. 8, 2013, the entire contents of which are incorporated into this specification.

The invention claimed is:

1. A method of manufacturing a bus bar unit including a bus bar, the bus bar having an annular-shaped or an arc-shaped main body part, an extension part extended from the main body part in a radial direction, and a coil connection part provided at a tip of the extension part, the bas bar being configured to pass a current to a coil wound around a stator, by connecting the coil connection part and the coil, the method comprising:

arranging the bus bar onto a lower mold;

holding the extension part by the lower mold and an upper mold; and performing inserting molding of the bus bar by injecting an insulating resin into a space defined between the lower mold and the upper mold.

* * * * *